United States Patent
Jang et al.

(10) Patent No.: US 9,531,788 B2
(45) Date of Patent: Dec. 27, 2016

(54) METHOD FOR DISTRIBUTING FILE DESCRIPTORS IN WEB-SERVER, AND WEB-SERVER AND COMPUTER-READABLE RECORDING MEDIUM USING THE SAME

(71) Applicant: TMAXSOFT. CO., LTD., Gyeonggi-do (KR)

(72) Inventors: Young Hwi Jang, Seoul (KR); Eui Geun Chung, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 0 days.

(21) Appl. No.: 14/791,905

(22) Filed: Jul. 6, 2015

(65) Prior Publication Data

US 2016/0337438 A1    Nov. 17, 2016

(30) Foreign Application Priority Data

May 14, 2015  (KR) ........................ 10-2015-0067665

(51) Int. Cl.

| | | |
|---|---|---|
| *G06F 15/167* | (2006.01) | |
| *H04L 29/08* | (2006.01) | |
| *H04L 12/879* | (2013.01) | |
| *H04L 1/18* | (2006.01) | |

(52) U.S. Cl.
CPC ............. *H04L 67/06* (2013.01); *H04L 1/1835* (2013.01); *H04L 49/901* (2013.01)

(58) Field of Classification Search
CPC ...................................................... G06F 15/16
USPC ......................................................... 709/216
See application file for complete search history.

(56) References Cited

U.S. PATENT DOCUMENTS

| | | | | |
|---|---|---|---|---|
| 8,745,105 | B2* | 6/2014 | Erofeev | H04L 29/0854 707/615 |
| 2005/0125539 | A1* | 6/2005 | Tripathi | H04L 69/163 709/227 |
| 2010/0146085 | A1* | 6/2010 | Van Wie | A63F 13/12 709/220 |
| 2010/0262650 | A1* | 10/2010 | Chauhan | H04L 67/26 709/203 |
| 2013/0097615 | A1* | 4/2013 | Falco | G06F 9/546 719/313 |

FOREIGN PATENT DOCUMENTS

| | | |
|---|---|---|
| KR | 1020010048804 | 6/2001 |
| KR | 1020090070938 | 7/2009 |

* cited by examiner

*Primary Examiner* — Aftab N. Khan
(74) *Attorney, Agent, or Firm* — Husch Blackwell LLP

(57) ABSTRACT

A method for distributing a file descriptor in a web server is disclosed. The method includes the steps of: (a) a listener processor, if acquiring at least one file descriptor representing a connection of a network between the web server and at least one client, transmitting the at least one file descriptor to a specific kernel buffer corresponding to a specified handler processor among at least one handler processor for handling at least one service request corresponding to the file descriptor, by referring to the number of file descriptors stored in each kernel buffer corresponding to each handler processor; and (b) the specified handler processor handling a service request of a specific client by receiving the file descriptor from the specific kernel buffer.

19 Claims, 3 Drawing Sheets

METHOD FOR DISTRIBUTING FILE DESCRIPTORS IN WEB-SERVER, AND WEB-SERVER AND COMPUTER-READABLE RECORDING MEDIUM USING THE SAME

CROSS REFERENCE TO RELATED APPLICATION

This application claims priority to and incorporates herein by reference all disclosure in Korean Patent Application No. 10-2015-0067665 filed May 14, 2015.

FIELD OF THE INVENTION

The present invention relates to a method for distributing file descriptors in a web server and the web server and a computer-readable recording media using the same; and more particularly, to the method for distributing the file descriptors in the web server which performs steps of: (a) a listener processor, if acquiring at least one file descriptor representing a connection(s) of a network(s) between the web server and at least one client, transmitting the at least one file descriptor to a specific kernel buffer corresponding to a specified handler processor among at least one handler processor for handling at least one service request corresponding to the file descriptor, by referring to the number of file descriptors stored in each kernel buffer corresponding to each handler processor; and (b) the specified handler processor handling a service request of a client by receiving the file descriptor with respect to the client from the specific kernel buffer, and the web server and the computer-readable recording medium using the same.

BACKGROUND OF THE INVENTION

A client, e.g., a browser, sends an HTTP request to a web server and receives an HTTP response from the web server in order to receive a service therefrom. As the HTTP operates on a transmission control protocol (TCP), a TCP connection, first of all, should be made between a client and the web server before the service starts. The web server can execute two or more processes to handle requests of numerous clients. Such a web server is called a multi-process web server.

FIG. 1 is a drawing for explaining a configuration and an operation of a multi-process web server according to the prior art.

By referring to FIG. 1, the multi-process web server 10 according to the prior art includes a listener processor 11, one or more kernel buffers 12-1 and 12-2, one or more handler processors 13-1 and 13-2, and a shared memory 14. Preferably, the web server 10 may have two or more kernel buffers and two or more handler processors, but for convenience of explanation, it is held up as an example that there are the two kernel buffers 12-1 and 12-2 and the two handler processors 13-1 and 13-2. The listener processor 11 transmits a file descriptor (fd) representing a TCP connection between the web server 10 and a client 20 to a specific kernel buffer among the multiple kernel buffers 12-1 and 12-2. The specific kernel buffer temporarily stores the received file descriptor and then delivers it to a specified handler processor. In general, the respective handler processors 13-1 and 13-2 maintain connections with at least one client 20 through the file descriptor received from the listener processor 11 and send HTTP requests and receive HTTP responses on the basis of the connections.

More specifically, FIG. 1 illustrates that 100 clients want to make new connections at the same time while a first handler processor 13-1 has already 7949 file descriptors and a second handler processor 13-2 has already 7950. The listener processor 11 compares the number of file descriptors held by the first handler processor 13-1 with that by the second handler processor 13-2 in reference to memory area F[1] and F[2] in a shared memory in order to deliver the respective newly connected file descriptors one by one to the first or the second handler processor which has a smaller number of file descriptors. Although the number of file descriptors, i.e., 7949, held by the first handler processor 13-1 is smaller than that, i.e., 7950, by the second handler processor 13-2, the first handler processor 13-1 may not receive a first new file descriptor because it is busy handling the already-received file descriptors. In this case, the first new file descriptor is stored in a first kernel buffer 12-1 corresponding to the first handler processor 13-1 and waits until the first handler processor 13-1 can handle the first new file descriptor. Then, if the listener processor 11 acquires a second new file descriptor, the listener processor 11 compares the number of file descriptors held by the first handler processor 13-1 with that by the second handler processor 13-2 by referring to the memory area F[1] and F[2] in the shared memory again in order to transmit the second new file descriptor to the first or the second handler processor which has a smaller number of file descriptors. As the first handler processor 13-1 is busy handling the already-received file descriptors, the memory area F[1] may have not been updated yet. Accordingly, the number of file descriptors held by the first handler processor 13-1 is determined to be less than that by the second handler processor 13-2 and therefore, the listener processor 11 delivers the second new file descriptor to the first kernel buffer 12-1 corresponding to the first handler processor 13-1. If this is repeated, 100 newly connected file descriptors are delivered to the first kernel buffer 12-1 corresponding to the first handler processor 13-1 in an instant. At the end, the first handler processor 13-1 and the second handler processor 13-2, respectively, will hold 8049 and 7950 file descriptors. Accordingly, the new 100 file descriptors fail to be equally distributed to both the first and the second handler processors. Furthermore, if each hander is limited to have only 8000 file descriptors, 49 file descriptors stored in the first kernel buffer 12-1 corresponding to the first handler processor 13-1 may be thrown out without delivering to the first handler processor 13-1.

Meanwhile, according to another prior art, a technology in which the listening processor 11 determines degrees of maintaining connections with the clients 20 by individual multiple handler processors 13-1 and 13-2 and then distributes each of the new file descriptors to an appropriate handler processor with a lower degree of maintaining the connection therewith has been introduced. Even though each of the new file descriptors are distributed to the appropriate handler processor with the lower degree of maintaining the connection with the clients 20, problems such as failing to be distributed equally or occurring a congestion situation are continuously generated.

SUMMARY OF THE INVENTION

It is an object of the present invention to solve all the aforementioned problems.

It is another object of the present invention to allow a listener processor of a web server to distribute file descriptors equally to handler processors.

It is still another object of the present invention to allow the listener processor to distribute the file descriptors equally to the handler processors by transmitting each of the file descriptors to an appropriate kernel buffer selected among multiple kernel buffers in reference to the number of file descriptors stored in the multiple kernel buffers.

It is still yet another object of the present invention to recognize the number of file descriptors stored in the kernel buffers without acquiring a lock on a shared memory of the web server and distribute the file descriptors to the handler processors in reference to the recognized number of the file descriptors to thereby enhance a performance of the web server.

It is still yet another object of the present invention to minimize the number of file descriptors thrown out even though the number of file descriptors connected to the web server is close to the limited number thereof.

In accordance with one aspect of the present invention, there is provided a method for distributing a file descriptor in a web server, including the steps of: (a) a listener processor, if acquiring at least one file descriptor representing a connection of a network between the web server and at least one client, transmitting the at least one file descriptor to a specific kernel buffer corresponding to a specified handler processor among at least one handler processor for handling at least one service request corresponding to the file descriptor, by referring to the number of file descriptors stored in each kernel buffer corresponding to each handler processor; and (b) the specified handler processor handling a service request of a specific client by receiving the file descriptor from the specific kernel buffer.

In accordance with another aspect of the present invention, there is provided a web server, including: a listener process for acquiring at least one file descriptor representing a connection of a network between the web server and at least one client; at least one handler processor for handling at least one service request corresponding to the file descriptor; and at least one kernel buffer, each of which corresponding to each handler processor; wherein the listener processor transmits the at least one file descriptor to a specific kernel buffer corresponding to a specified handler processor among the at least one handler processor by referring to the number of file descriptors stored in each kernel buffer; and wherein the specified handler processor handles a service request of a specific client by receiving the file descriptor from the specific kernel buffer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
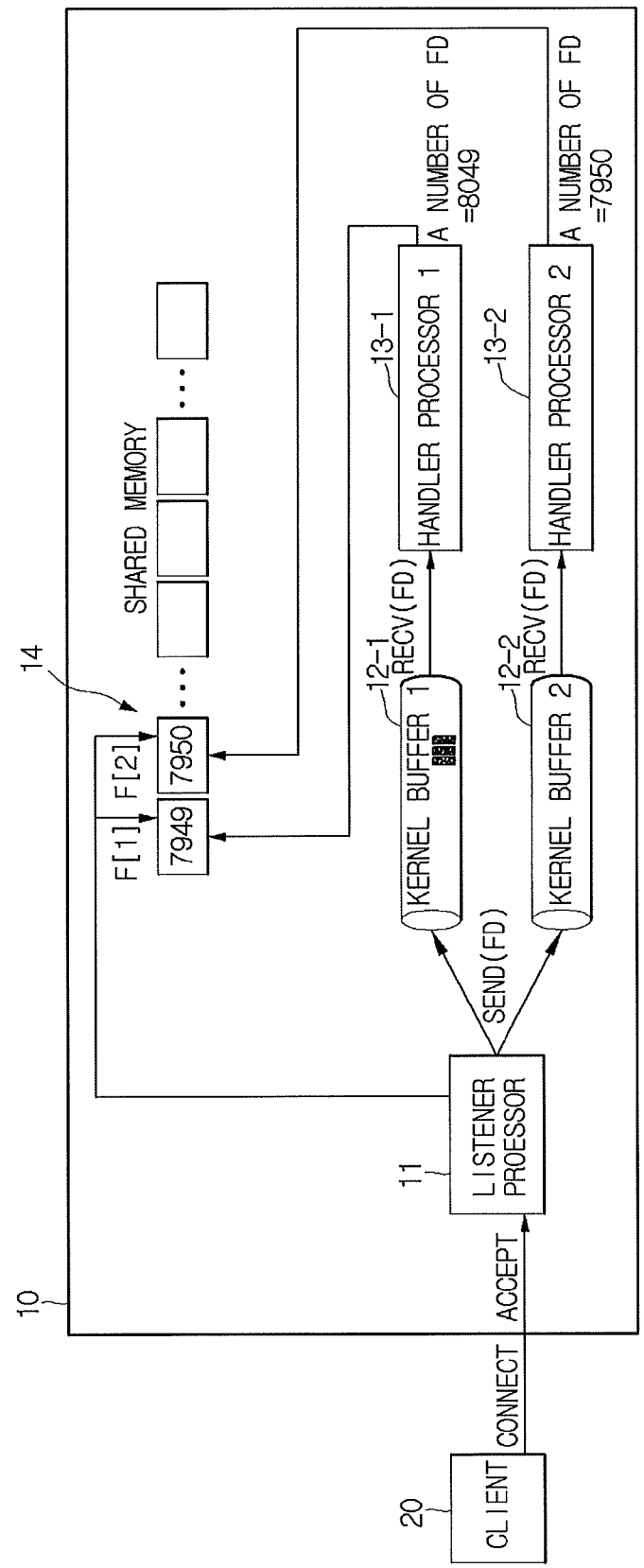
FIG. 1 is a drawing for explaining a configuration and an operation of a multi-process web server according to the prior art.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
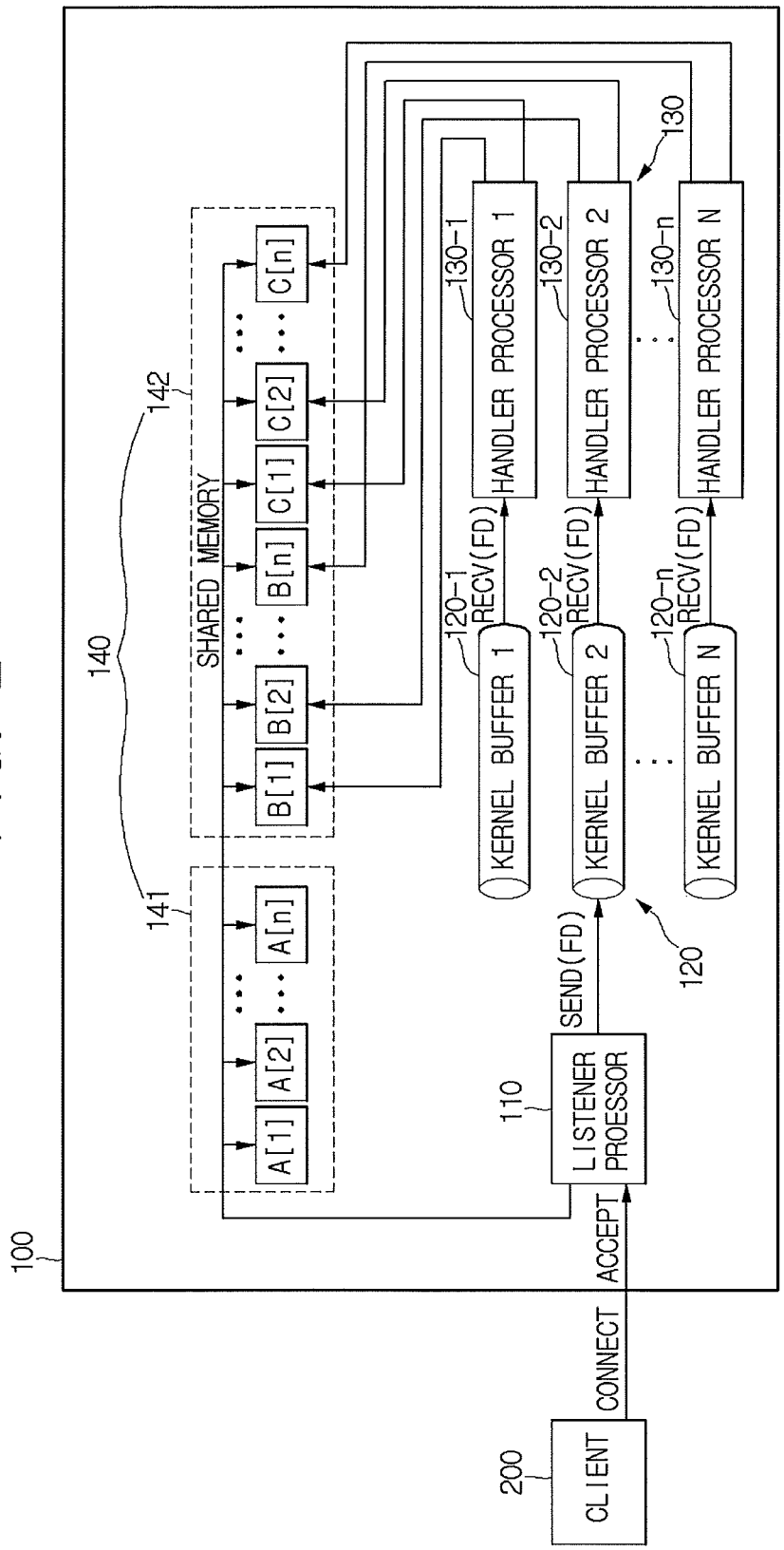
FIG. 2 is a block diagram for explaining a configuration and an operation of a web server in accordance with one example embodiment of the present invention.

To allow those skilled in the art to the present invention to be carried out easily, the example embodiments of the present invention by referring to attached diagrams will be explained in detail as follows:

FIG. 2 is a block diagram for explaining a configuration and an operation of a web server in accordance with one example embodiment of the present invention.

By referring to FIG. 2, the web server 100 in accordance with one example embodiment of the present invention may include a listener processor 110, kernel buffers 120, handler processors 130, and memory 140.

The listener processor 110 executes a listener process for acquiring file descriptors created through TCP connections from at least one client 200. More specifically, the listener processor 110 may acquire at least one file descriptor representing at least one network connection between the web server 100 and the at least one client 200. The file descriptor represents a pointer of a file structure that includes information on ports for distinguishing sockets used for communications and data on an IP address at an Internet layer created by a kernel. The listener processor 110 may properly distribute acquired file descriptors to one of kernel buffers 120-1, 120-2, . . . , and 120-n corresponding to respective handler processors 130-1, 130-2, . . . , and 130-n, which will be explained later. The listener processor 110 may be a certain core in a multi-core processor included in the web server 100 or a particular processor among multi-processors included therein. Contrarily, it may be also a single core or a single processor.

The kernel buffers 120 may temporarily store file descriptors received from the listener processor 110 and then deliver them to the corresponding handler processors 130. As it takes a quite longer time for the handler processors 130 to handle HTTP requests, the kernel buffers 120 may store file descriptors for a while and deliver them to the handler processors 130 if the handler processors 130 are ready to receive them. In accordance with one example embodiment of the present invention, the web server 100 may include the handler processors 130-1, 130-2, . . . , and 130-n and the kernel buffers 120-1, 120-2, . . . , and 120-n corresponding respectively to the handler processors 130-1, 130-2, . . . , and 130-n.

The handler processors 130 execute handler processes for handling service requests corresponding to the file descriptors. More specifically, the handler processors 130 receive file descriptors from their corresponding kernel buffers and perform HTTP responses at the HTTP requests of the clients 200 while maintaining network connections with the clients 200 through the file descriptors. As mentioned above, the web server 100 may include the handler processors 130-1, 130-2, . . . , and 130-*n*. The handler processors 130 may be a certain core of a multi-core processor included in the web server 100 or a fixed processor among the multi-processors included therein. Contrarily, they could be also a single core or a single processor.

By referring to the number of file descriptors stored in the kernel buffers 120, the listener processor 110 may particularly transmit each of the file descriptors to an appropriate kernel buffer selected among multiple kernel buffers in reference to the number of file descriptors stored in the multiple kernel buffers. However, if a certain handler processor determined to be appropriate to receive a new file descriptor among the handler processors 130 is busy reading HTTP requests from already-received file descriptors and performing HTTP responses, the certain handler processor could not receive the new file descriptor sent by the listener processor 110. This phenomenon may occur very often under a heavy load situation where the listener processor 110 is sending and receiving HTTP requests/responses with numerous clients. Under the situation, if file descriptors are distributed in consideration of only the number of file descriptors held by the handler processors 130-1, 130-2, . . . , and 130-*n*, the file descriptors cannot be distributed equally and may concentrate in some handler processors. In accordance with the present invention, by referring to the number of file descriptors stored in the kernel buffers 120, the listener processor 110 can distribute the file descriptors equally.

By referring to the number A of file descriptors transmitted from the listener processor 110 to the kernel buffers 120-1, 120-2, . . . , and 120-*n* corresponding respectively to the respective handler processors 130-1, 130-2, . . . , and 130-*n* and the number B of file descriptors which the respective handler processors 130-1, 130-2, . . . , and 130-*n* receive from the respective kernel buffers 120-1, 120-2, . . . , and 120-*n*, the listener processor 110 in accordance with one example embodiment of the present invention may calculate the number of file descriptors stored in the respective kernel buffers 120-1, 120-2, . . . , and 120-*n* corresponding to the respective handler processors 130-1, 130-2, . . . , and 130-*n*. More specifically, the listener processor 110 may acquire the number of file descriptors stored in the respective kernel buffers 120-1, 120-2, . . . , and 120-*n* by using a value of subtracting the number B of file descriptors from the number A of file descriptors. If the value of subtracting B from A is negative, A exceeds a maximum permissible value and, therefore, the maximum value may be added to the value of subtracting B from A. For example, if A is a value of an unsigned int, the maximum value of 4,294,967,295 may be added to (A-B). The listener processor 110 may transmit each of the file descriptors to an appropriate kernel buffer selected among multiple kernel buffers in reference to the number of file descriptors stored in the multiple kernel buffers 120-1, 120-2, . . . , and 120-*n* corresponding respectively to the handler processors 130-1, 130-2, . . . , and 130-*n*.

At the time, information on the number A of file descriptors and the number B of file descriptors may be recorded on the shared memory 140. In FIG. 2, it can be found that the number of file descriptors transmitted from the listener processor 110 to the first kernel buffer 120-1 corresponding to the first handler processor 130-1 is stored in a memory area A[1] and the number of file descriptors transmitted from the listener processor 110 to the second kernel buffer 120-2 corresponding to the second handler processor 130-2 is stored in a memory area A[2]. Similarly, it can be found that the number of file descriptors transmitted from the first kernel buffer 120-1 to the first handler processor 130-1 is stored in a memory area B[1] and the number of file descriptors transmitted from the second kernel buffer 120-2 to the second handler processor 130-2 is stored in a memory area B[2]. As such, the numbers A and B of file descriptors are recorded on the shared memory 140 because information on the numbers A and B of file descriptors must be accessible to calculate the number of file descriptors stored in the respective kernel buffers 120-1, 120-2, . . . and 120-*n* corresponding to the respective handler processors 130-1, 130-2, . . . , and 130-*n*.

Besides, the number A of file descriptors transmitted from the listener processor 110 to the kernel buffers 120-1, 120-2, . . . , and 120-*n* corresponding respectively to the handler processors 130-1, 130-2, . . . , and 130-*n* may be recorded in a first area 141 on the shared memory 140 and the number B of file descriptors transmitted from the kernel buffers 120-1, 120-2, . . . , and 120-*n* to the handler processors 130-1, 130-2, . . . , and 130-*n* may be recorded in a second area 142 thereon. In other words, the numbers A and B of file descriptors may be recorded in different areas on the shared memory 140.

Moreover, as illustrated in FIG. 2, the respective numbers B[1]'B[n] of file descriptors transmitted from the respective kernel buffers 120-1, 120-2, . . . , and 120-*n* to the respective handler processors 130-1, 130-2, . . . , and 130-*n* may be recorded not to be overlapped with one another on different detailed parts in the second area 142 on the shared memory 140.

Contrary to the aforementioned example embodiment, the number A of file descriptors may be stored on exclusive memory to which only the listener processor 110 is accessible. It is because the number A of file descriptors may be calculated, updated, and referred to only by the listener processor 110. For reference, information on the number B of file descriptors may be accessible to not only by the listener processor 110 but also by the respective handler processors 130-1, 130-2, . . . , and 130-*n*. The listener processor 110 must be accessible to the information on the number B of the file descriptors to distribute the file descriptors equally by subtracting the number B of file descriptors from the number A of file descriptors.

Meanwhile, as the numbers A and B of the file descriptors are stored in separate areas on the memory and, upon updating the values of the numbers A and B, only the listener processor 110 or any of the handler processors 130-1, 130-2, . . . , and 130-*n* access the file descriptors, it is not necessary to acquire the lock on the memory.

The simple conventional method for managing a number of file descriptors stored in a kernel buffer corresponding to a handler processor is to adjust one variable recorded on memory by referring to the number of file descriptors sent by the listener processor and the number of file descriptors received by the handler processor. In other words, through a process for increasing the variable when the listener processor sends the file descriptors and reducing the variable when the handler processor receives the file descriptors, the number of file descriptors which have been sent by the listener processor but have not been received by the handler processor (that is, stored in the kernel buffer) may be identified. However, to do this, a lock should be acquired on memory whenever the listener processor sends the file descriptors and the handler processor receives them. Acquiring the lock degrades the performance of the web server.

Accordingly, as mentioned above, the present invention can improve the performance of the web server 100 because the number of file descriptors stored in the kernel buffers 120 is calculated without acquiring the lock on the shared memory by allocating respective detailed parts on the shared memory for respective variables.

In accordance with one example embodiment of the present invention, by additionally referring to not only the number E of file descriptors stored in the kernel buffers 120-1, 120-2, . . . , and 120-3 corresponding respectively to the handler processors 130-1, 130-2, . . . , and 130-n but also the number C of file descriptors currently handled by the respective handler processors 130-1, 130-2, . . . , and 130-n, the listener processor 110 may also transmit each of new file descriptors to an appropriate kernel buffer selected among the multiple kernel buffers. It is because the number of file descriptors currently connected or waiting for being connected among the file descriptors transmitted from the listener processor 110 to the kernel buffers 120-1, 120-2, . . . , and 120-n can be found by adding the number E of file descriptors stored in the respective kernel buffers 120-1, 120-2, . . . , and 120-3 and the number C of file descriptors currently handled by the respective handler processors 130-1, 130-2, . . . , and 130-n. Therefore, the listener processor 110 may distribute the new file descriptors equally by referring to the number. The listener processor 110 may transmit each of the new file descriptors to a specific kernel buffer corresponding to a specified handler processor which has the least number of file descriptors currently handled or waiting for being connected.

On one hand, the number C, i.e., C[1]~C[n], of file descriptors currently handled by the respective handler processors 130-1, 130-2, . . . , and 130-n may be counted by including the number of file descriptors being connected with at least one client 200 even though the service requests from the client 200 have been completely handled by the handler processors. Even though the service requests have been completely handled by the handler processors, as long as the client 200 is connected with the handler processors, HTTP requests and responses could be made continuously on the basis of the connection between the client 200 and the handler processors. However, if the client 200 and the handler processors are disconnected from each other, the number C of file descriptors currently handled by the respective handler processors 130-1, 130-2, . . . , and 130-n may be reduced.

One the other hand, if the listener processor 110 transmits a file descriptor to a specific kernel buffer corresponding to a specified handler processor among the handler processors 130-1, 130-2, . . . , and 130-n, the listener processor 110 may increase the number A of file descriptors transmitted to the specific kernel buffer recorded on the shared memory 140. At the time, the number A of the file descriptors may be recorded in a first exclusive area on the shared memory 140. Herein, the first exclusive area is allotted for the specified handler processor.

Similarly, if the specified handler processor among the handler processors 130-1, 130-2, . . . , and 130-n receives a file descriptor from the specific kernel buffer corresponding thereto, the specified handler processor may increase the number B of file descriptors received from the specific kernel buffer recorded on the shared memory 140 correspondingly. At the time, the number B of the file descriptors may be recorded in a second exclusive area on the shared memory 140. Herein, the second exclusive area is also allotted for the specified handler processor.

In the similar way, if the specified handler processor among the handler processors 130-1, 130-2, . . . , and 130-n receives a file descriptor from the specific kernel buffer, the specified handler processor may increase the number C of file descriptors currently handled by itself. Herein, information on the number C is recorded in a detailed part, which is different from other detailed part where the number B of file descriptors is recorded, on the shared memory 140. The number of file descriptors C may be reduced if the client 200 and the handler processors are disconnected from each other.

Upon transmitting each of new file descriptors, the listener processor 110 may calculate a value by adding the number C of file descriptors to the difference between the number A and B of file descriptors for the respective handler processors 130-1, 130-2, . . . , and 130-n and transmit each of the new file descriptors to a specific kernel buffer corresponding to a specified handler processor which has the least value among the calculated values. If the difference between the numbers A and B of the file descriptors is negative, the maximum number allocable to the number A of file descriptors is added again to the calculated value.

The listener processor 110 may distribute the new file descriptors in consideration of both the number of file descriptors existing in the kernel buffers 120 and the number of file descriptors maintained by the handler processors 130. Accordingly, as the new file descriptors are capable of being finally distributed equally to the handler processors 130-1, 130-2, . . . , and 130-n, the present invention may enhance the performance of the web server 100.

A more specific example of file descriptors being distributed equally to the two handler processors 130-1 and 130-2, if the number of file descriptors existing in the kernel buffers 120-1 and 120-2 is considered under the condition of the web server 100 in which the two handler processors 130-1 and 130-2 and their corresponding kernel buffers 120-1 and 120-2 are included, will be made below.

Figure 3:
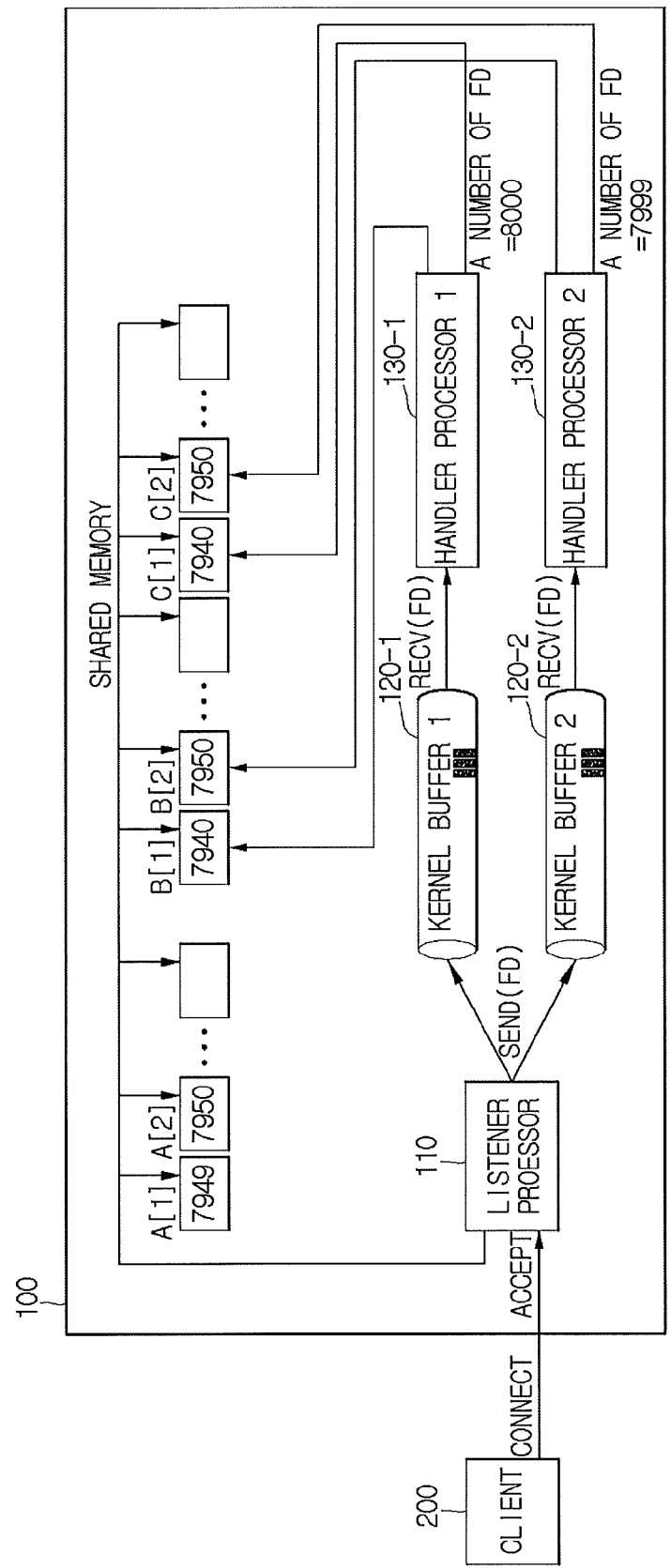
FIG. 3 is a drawing for illustrating an example of the number of file descriptors finally distributed to handler processors by referring to the number of file descriptors existing in kernel buffers in accordance with the present invention.

FIG. 3 is a drawing for illustrating an example of the number of file descriptors distributed to handler processors if the number of file descriptors existing in the kernel buffers is considered in accordance with the present invention.

Just as shown in an aforementioned example of FIG. 1, FIG. 3 illustrates a case in which 100 clients want to be connected with the handler processors while the first handler processor 130-1 and the second handler processor 130-2 of the web server 100 have 7949 and 7950 file descriptors, respectively. To transmit newly connected file descriptors one by one, the listener processor 110 monitors the number, i.e., 7949, of file descriptors transmitted from the listener processor 110 to a first kernel buffer 120-1 and the number, i.e., 7950, of file descriptors transmitted from the listener processor 110 to a second kernel buffer 120-2 by referring to memory areas A[1] and A[2] in the shared memory. In addition, the listener processor 110 monitors the number, i.e., 7940, of file descriptors received by the first handler processor 130-1 from the first kernel buffer 120-1 and the number, i.e., 7950, of file descriptors received by the second handler processor 130-2 from the second kernel buffer 120-2 by referring to memory areas B[1] and B[2] in the shared memory. Besides, the listener processor 110 monitors the number, i.e., 7940, of file descriptors currently handled by the first handler processor 130-1 and that, i.e., 7950, by the second handler processor 130-2 by referring to memory area C[1] and C[2] in the shared memory. The listener processor 110 may acquire the number of file descriptors currently connected or waiting for being connected with respect to the first handler processor 130-1 by referring to A[1], B[1], and C[1], that is, by calculating a value of A[1]−a value of B[1]+a value of C[1]. Further, the listener processor 110 may acquire the number of file descriptors currently connected or waiting for being connected with respect to the second handler processor 130-2 by referring to A[2], B[2], and C[2], that is, by calculating a value of A[2]−a value of B[2]+a value of C[2]. Since the number of file descriptors currently connected or waiting for being connected with respect to the first handler processor 130-1 is less than that with respect to the second handler processor 130-2, the listener processor 110 transmits a first new file descriptor to the first kernel buffer 120-1. Even for a second new file descriptor which follows the first new file descriptor, comparison is performed in the same way. In this case, as the number of file descriptors currently connected or waiting for being connected with respect to the first handler processor 130-1 is equal to that with respect to the second handler processor 130-2, the listener processor 110 may transmit the second new file descriptor to any of the kernel buffers 120-1 and 120-2. In the example embodiment of FIG. 3, the second new file descriptor is shown to be transmitted to the first kernel buffer 120-1 according to predetermined order of the kernel buffers. In the next comparison situation, as there are 7951 file descriptors currently connected or waiting for being connected with respect to the first handler processor 130-1 and 7950 file descriptors with respect to the second handler processor 130-2, a third new file descriptor which follows the second new file descriptor is transmitted to the second kernel buffer 120-2. At last, after all the new 100 file descriptors are transmitted to the first kernel buffer or the second kernel buffer, the first handler processor 130-1 may have 8000 file descriptors and the second handler processor 130-2 may have 7999. Therefore, the new file descriptors are distributed equally to the respective handler processors. At the time, even though each handler processor has a limited ability of processing at most 8000 file descriptors, no file descriptors are thrown out.

As such, as requests are handled with file descriptors equally distributed to the handler processors even under a load situation, the web server 100 in accordance with the present invention may prevent degradation of its performance and minimize the number of file descriptors left out even though the number of file descriptors connected to the web server is close to the limited number thereof.

The present invention has effects as shown below.

The present invention has an effect of allowing the listener processor to distribute the file descriptors equally to the handler processors.

The present invention has another effect of allowing the listener processor to distribute the file descriptors equally to the handler processors by transmitting each of the file descriptors to an appropriate kernel buffer selected among multiple kernel buffers in reference to the number of file descriptors stored in the multiple kernel buffers.

The present invention has still another effect of recognizing the number of file descriptors stored in the kernel buffers without acquiring a lock on a shared memory of the web server and distributing the file descriptors to the handler processors in reference to the recognized number of the file descriptors to thereby enhance a performance of the web server.

The present invention has still yet another effect of minimizing the number of file descriptors thrown out even though the number of file descriptors connected to the web server is close to the limited number thereof.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for distributing a file descriptor in a web server apparatus, the method comprising the steps of:
   (a) a computing device for implementing a listener processor, said listener processor acquiring at least one file descriptor, the at least one file descriptor representing a connection of a network between the web server apparatus and at least one client computing device, and transmitting the at least one file descriptor from the listener processor to an electronic memory embodied as a plurality of kernel buffers, said at least one file descriptor being transmitted to a specific said kernel buffer corresponding to a specified handler processor among a plurality of handler processors implemented by a computing device, said specific handler processor for handling at least one service request corresponding to the file descriptor, by referring to the number of file descriptors stored in each kernel buffer corresponding to each handler processor, where each kernel buffer is associated with its own handler processor to form a kernel buffer-handler processor pair; and
   (b) the specified handler processor handling a service request of a specific client by receiving the file descriptor from the specific kernel buffer;
   wherein, at the step of (a), the specific kernel buffer is selected among the at least one kernel buffers based on a number of total file descriptors between each kernel buffer-handler processor pair.

2. The method of claim 1, wherein the number of file descriptors stored in each kernel buffer is calculated by referring to the number A of file descriptors transmitted from the listener processor to each kernel buffer and the number B of file descriptors received by each handler processor from each corresponding kernel buffer.

3. The method of claim 1, wherein the number of file descriptors currently handled by each handler processor is calculated by including the number of file descriptors being connected with the client, even though the service request from the client has been completely handled by the handler processor.

4. The method of claim 3, wherein the number of file descriptors currently handled by each handler processor is reduced if the client and the corresponding handler processor are disconnected from each other.

5. The method of claim 1, wherein information on the number A of file descriptors transmitted from the listener processor to each kernel buffer and the number B of file descriptors received by each handler processor from each corresponding kernel buffer is recorded on a shared memory.

6. The method of claim 5, wherein the number A of file descriptors is recorded in a first area on the shared memory and the number B of file descriptors is recorded in a second area on the shared memory.

7. The method of claim 6, wherein each number B of file descriptors for each handler processor is recorded not to be overlapped with one another on a different detailed parts in the second area on the shared memory.

8. The method of claim 1, wherein, if transmitting file descriptors to the specific kernel buffer, the listener processor increases the number of the file descriptors, transmitted to the specific kernel buffer, recorded in a first exclusive area on the shared memory corresponding to the specified handler processor.

9. The server of claim 8, wherein, if the specified handler processor receives the file descriptors from the specific kernel buffer, the specified handler processor increases the number of the file descriptors, received from the specific kernel buffer, recorded in a second exclusive area on the shared memory corresponding to the specified handler processor.

10. A web server device, comprising:
a computing device for implementing at least one processor including:
a listener processor for acquiring at least one file descriptor representing a connection of a network between the web server device and at least one client computing device;
at least one handler processor for handling at least one service request corresponding to the file descriptor; and
an electronic memory embodied as at least one kernel buffer, each said kernel buffer corresponding to a respective one of said at least one handler processor to form a kernel buffer-handler processor pair;
wherein the listener processor transmits the at least one file descriptor to a specific kernel buffer of a kernel buffer-handler processor pair based on a number of total file descriptors between each kernel buffer-handler processor pair; and
wherein the specified handler processor handles a service request of a specific client by receiving the file descriptor from the specific kernel buffer.

11. The web server of claim 10, wherein the number of file descriptors stored in each kernel buffer is calculated by referring to the number A of file descriptors transmitted from the listener processor to each kernel buffer and the number B of file descriptors received by each handler processor from each corresponding kernel buffer.

12. The web server of claim 10, wherein the number of file descriptors currently handled by each handler processor is calculated by including the number of file descriptors being connected with the client, even though the service request from the client has been completely handled by the handler processor.

13. The web server of claim 12, wherein the number of file descriptors currently handled by each handler processor is reduced if the client and the handler processor are disconnected from each other.

14. The web server of claim 10, further comprising a shared memory; wherein information on the number A of file descriptors transmitted from the listener processor to each kernel buffer and the number B of file descriptors received by each handler processor from each corresponding kernel buffer is recorded on the shared memory.

15. The web server of claim 14, wherein the number A of file descriptors is recorded in a first area on the shared memory and the number B of file descriptors is recorded in a second area on the shared memory.

16. The web server of claim 15, wherein each number B of file descriptors for each handler processor is recorded not to be overlapped with one another on a different detailed parts in the second area on the shared memory.

17. The web server of claim 10, further comprising a shared memory; wherein, if the listener processor transmits file descriptors to the specific kernel buffer, the listener processor increases the number of file descriptors, transmitted to the specific kernel buffer, recorded in a first exclusive area on the shared memory corresponding to the specified handler processor.

18. The web server of claim 17, wherein, if the specified handler processor receives the file descriptors from the specific kernel buffer, the specified handler processor increases the number of file descriptors, received from the specific kernel buffer, recorded in a second exclusive area on the shared memory corresponding to the specified handler processor.

19. One or more non-transitory computer-readable recording media having stored thereon a computer program that, when executed by a web server apparatus, causes the one or more processors to perform acts including:
(a) acquiring, via a computing device for implanting a listener processor, at least one file descriptor, the at least one file descriptor representing a connection of a network between the web server apparatus and at least one client computing device, and transmitting the at least one file descriptor from the listener processor to an electronic memory embodied as a plurality of kernel buffers, said at least one file descriptor being transmitted to a specific said kernel buffer corresponding to a specified handler processor among a plurality of said handler processors implemented by a computing device, said specific handler processor for handling at least one service request corresponding to the file descriptor, by referring to the number of file descriptors stored in each kernel buffer corresponding to each handler processor, where each kernel buffer is associated with its own handler processor to form a kernel buffer-handler processor pair; and
(b) the specified handler processor handling a service request of a specific client by receiving the file descriptor from the specific kernel buffer;
wherein, at the act of (a), the specific kernel buffer is selected among the at least one kernel buffers based on a number of total file descriptors between each kernel buffer-handler processor pair.

* * * * *